United States Patent

[11] 3,634,865

| [72] | Inventor | Clifford O. Schafer<br>Houston, Tex. |
|---|---|---|
| [21] | Appl. No. | 37,601 |
| [22] | Filed | May 15, 1970 |
| [45] | Patented | Jan. 11, 1972 |
| [73] | Assignee | Schlumberger Technology Corporation<br>New York, N.Y. |

[54] METHODS AND APPARATUS FOR RECORDING WELL LOGGING DATA
20 Claims, 23 Drawing Figs.

[52] U.S. Cl. .................................................. 346/1,
346/109
[51] Int. Cl. .................................................. G01d 15/14,
G01v
[50] Field of Search........................................ 346/109,
108, 33 W, 1; 179/100.3 F, 100.3 H, 100.3 N;
178/6.7 R

[56] References Cited
UNITED STATES PATENTS
2,415,880   2/1947   Hassler........................   346/109

3,293,656   12/1966   Blayney et al. ................   346/109
3,482,254   12/1969   Harrison et al. ...............   346/109 X Primary Examiner—Joseph W. Hartary
Attorneys—William J. Beard, Leonard R. Fellen, Donald H. Fidler, Stewart F. Moore, Jerry M. Presson, Edward M. Roney, William R. Sherman and John P. Sinnott ABSTRACT: In accordance with illustrative embodiments of the present invention, techniques are described for producing relatively even density recordings of well logging signals even when the frequency of these signals, or the velocity of the recording medium, varies. To accomplish this, with optical recording means for example, the rate of movement of the recording light beam across the recording medium and the rate of movement of the recording medium itself are measured. Signals representative of these measured rates or velocities are processed and used to adjust a parameter of the light source which produces the recording light beam to cause a relatively even density recording to be produced.

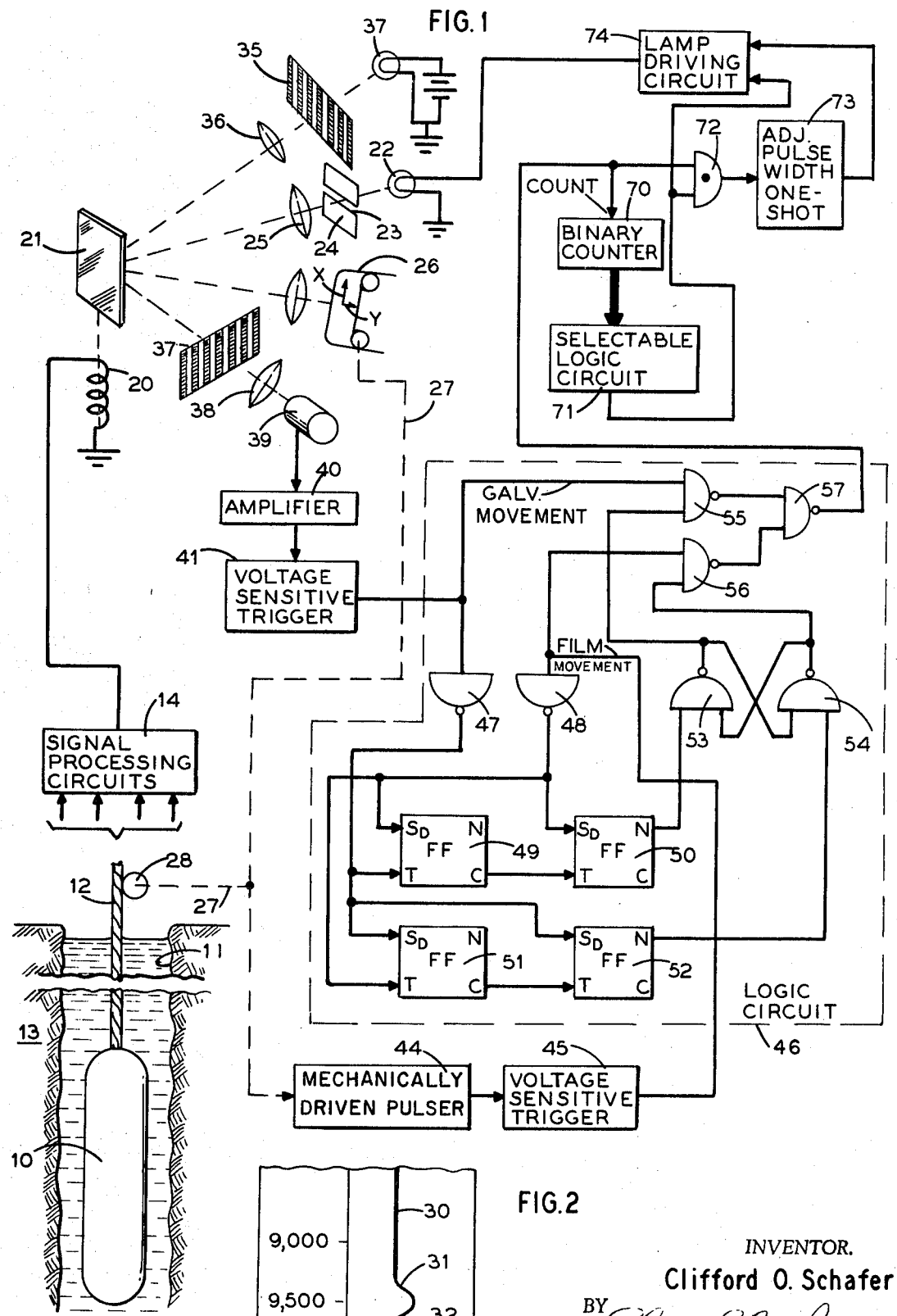

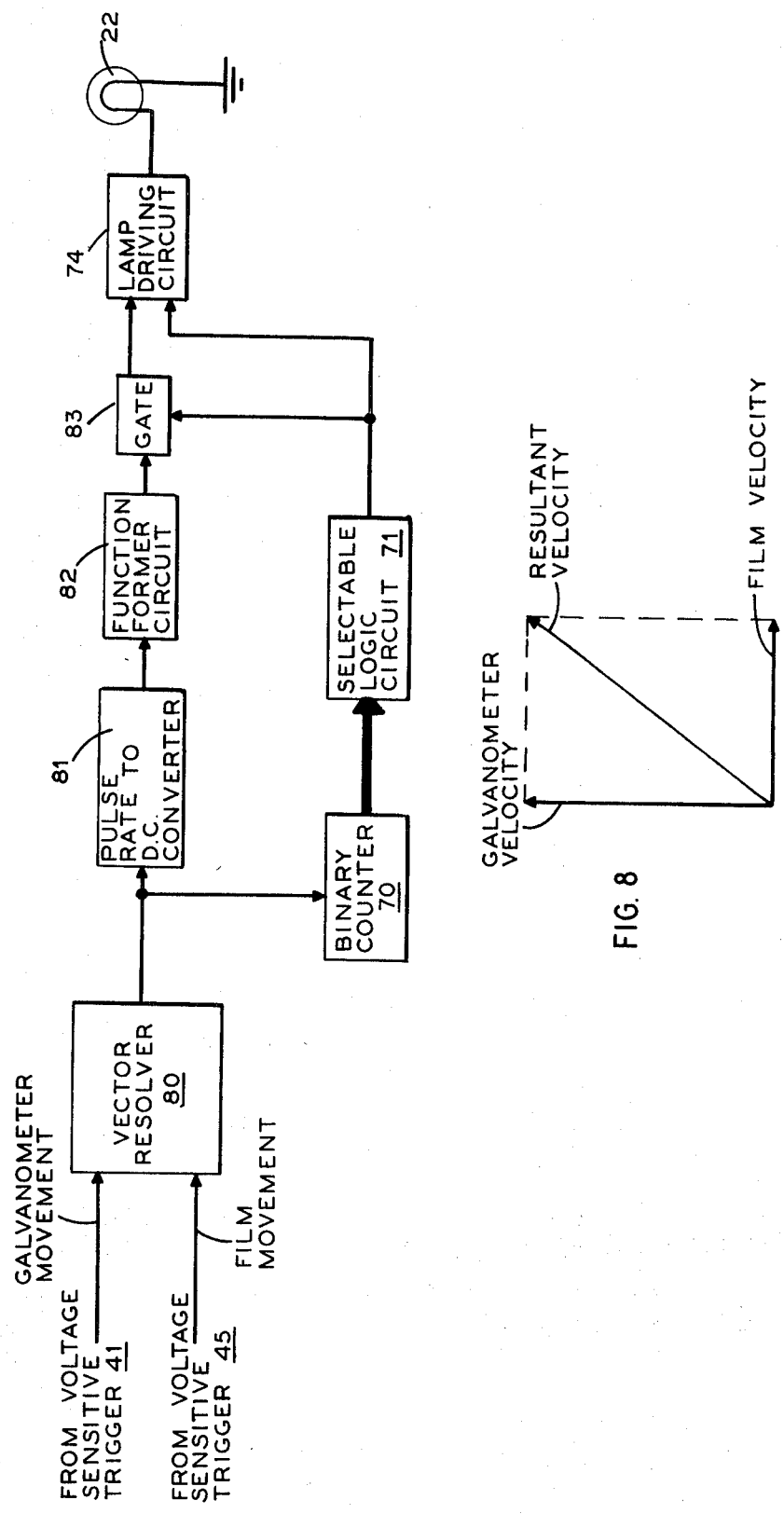

METHODS AND APPARATUS FOR RECORDING WELL LOGGING DATA

This invention relates to methods and apparatus for use in recording well logging data, and more particularly to methods and apparatus for improving the quality of well log recordings.

In the logging of formations adjoining a borehole in accordance with present practice, one or more signals representative of the nature and character of the formations adjoining a borehole, or in some cases the nature of the borehole itself, are transmitted from a well tool in a borehole to the surface of the earth for subsequent processing and recording as a function of borehole depth. These signals vary as a function of the investigated characteristic. Thus, in the case of resistivity logging, the amplitude of the signal transmitted to the surface of the earth will vary as a function of the electrical resistivity of the formations adjoining the borehole. The signals are then, in the usual case, recorded as a function of depth on a roll of film which, after developing, produces a log of the investigated characteristic versus borehole depth.

The most common form of well log recording apparatus presently in commercial use is the so-called galvanometer type of recording device. In this galvanometer recording apparatus, the derived electrical signal, after suitable processing, is applied to a solenoid which rotates a mirror to a rotational position representative of the amplitude of the well logging signal to be recorded. A nearby light source generates a light beam which is reflected off the mirror and onto a nearby film which is being moved as a function of the movement of the downhole exploring device. The angular orientation of the rotatable mirror will position the light beam at a point on the film which, when referenced to the zero reference line on the film gives the amplitude of the measured formation characteristic as a function of depth. Either a continuous trace can be produced on the film by making the light beam continuous or a series of dots can be produced on the film by turning the light beam on and off. Such a series of dots can be made to appear as a continuous trace to the naked eye.

If the measured formation characteristic is substantially constant in amplitude, then the mirror will maintain a substantially constant orientation and the light beam will impinge on the film at a fixed transversely oriented point thereon (transverse relative to the direction of movement of the film). On the other hand, if the well logging signal is fluctuating rapidly, then the rotatable mirror will cause the limit beam to move rapidly across the film. Likewise, if the downhole exploring device is moving at a relatively slow speed, the galvanometer will turn slowly, thus moving the light beam along the film in a relatively slow manner, and conversely, if the exploring device is being moved through the borehole at a relatively great speed, the light beam will move along the film at a relatively great speed.

Unfortunately, the density or darkness of each point on the log, after developing the film, will be dependent on the amount of time that the light beam impinged on each given point on the film. If the light beam is turned on and off to produce a dotted or dashed trace, the length of each dot or dash would be dependent on the rate of movement of the limit beam or film. Thus, if either or both of these rates vary, the dots or dashes will be nonuniform in length as well as trace density. Therefore, the log presentation will tend to be of poor quality if either the rate of movement of the tool or the rate of change of the signal being recorded varies.

It is, therefore, an object of the present invention to provide new and improved methods and apparatus for use in recording well logging data.

It is a further object of the present invention to provide new and improved recording methods and apparatus for well logging data wherein a constant density well log presentation can be achieved regardless of the rate of movement of the downhole exploring device or the rate of change of the well logging signal being recorded.

In accordance with the invention, methods and systems for recording well logging signals comprise deriving well logging signals which vary as a function of borehole depth for recording as a function of borehole depth. To record these signals, a controllable energy source such as a light source produces energy which is positioned at a location on a recording medium determined by the amplitude of the signals. The recording medium is moved as a function of the movement of the exploring device from which the signals were derived.

To insure that an even density trace is produced on the recording medium, a parameter of the controllable energy source is adjusted in response to data representative of either the rate of movement of the film or the light beam across the film.

For a better understanding of the present invention, together with other and further objects thereof, reference is had to the following description taken in connection with the accompanying drawings, the scope of the invention being pointed out in the appended claims.

Referring to the drawings:

FIG. 1 shows a well tool in a borehole along with a schematic representation of apparatus for recording well logging signals in accordance with the present invention;

FIG. 2 illustrates a typical well log produced by prior art recording devices;

FIG. 8 is a vector diagram useful in explaining certain features of the present invention; and FIG. 9 represents another embodiment of the present invention.

Figure 3:
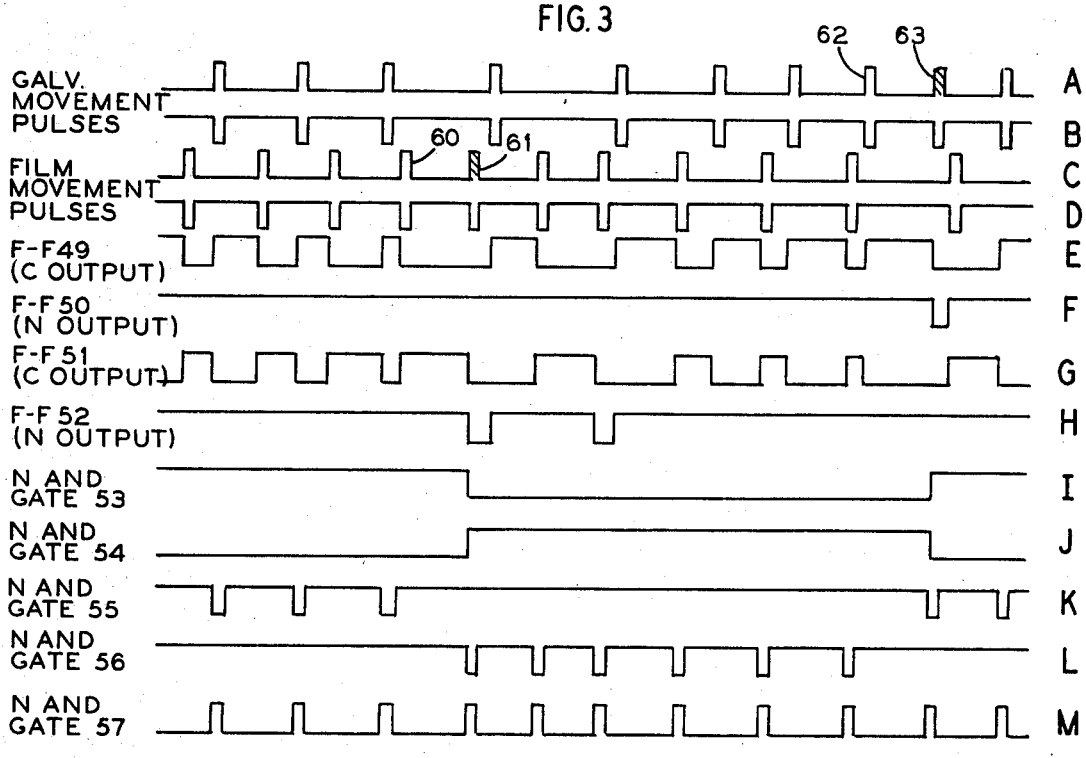
FIGS. 3A-3M are waveform diagrams useful in explaining the operation of certain portions of the FIG. 1 apparatus.

Now referring to FIG. 1, a well tool 10 is supported in a borehole 11 on the end of a cable 12 for investigating subsurface earth formations 13. The well tool 10 supplies one or more electrical signals representative of selected characteristics of the borehole or adjoining formations over the cable conductors of the cable 12 to suitable signal processing circuits 14. These signal processing circuits 14 perform many of the well-known signal processing functions on the derived well logging signals. The output signals from the signal processing circuits 14 are then applied to the recording apparatus of the present invention to be recorded on film as a function of borehole depth.

Concerning one channel of this recording apparatus in detail, a well logging signal is applied to a solenoid 20 which controls the angular position of a rotatable mirror 21 in accordance with the amount of current applied to the solenoid 20. The solenoid 20 and mirror 21 comprises a galvanometer. A suitable radiation energy source 22, e.g., a miniature incandescent lamp for producing a light beam, supplies a beam of light through a narrow slit 23 to a collecting lens 25 which collects the light passing through the slit 23 and passes it to a rotatable mirror 21. This light is reflected off the rotatable mirror 21 onto a recording medium 26, in this example, an exposable film. The film 26 is moved as a function of borehole depth by a rotatable shaft 27 connected to a rotating wheel 28 in engagement with the cable 12. It can thus be seen that the beam of light will move along the direction indicated by the arrow X as the film 26 moves, and along the direction indicated by the arrow Y as the galvanometer 21 rotates. It can be appreciated that if the rate of movement of the image on the film 26 changes, then the exposure time at each point on the film 26 will likewise change, thus causing varying degrees of exposure.

Taking an example of this, refer to FIG. 2 where there is shown a typical log after developing. As seen by the portion of the log indicated generally at 30, if the galvanometer mirror 21 is stationary and the well tool is moving at a desired rate of speed, a nice even density trace will be reproduced on the log.

As seen at the area designated generally as 31 on the log of FIG. 2, when the galvanometer mirror 21 moves across the film, the trace will tend to be lighter. An extreme case of this is indicated by the excursion 32 where the trace all but fades out. If the rate of movement of the logging tool increases, as indicated at the point 33, the trace will again become lighter than usual.

The apparatus of the present invention is adapted to provide a substantially constant density log regardless of the frequency of the well logging signal, i.e., the rate of movement of the galvanometer mirror 21, or the rate of movement of the logging tool 10. This is accomplished by monitoring both the rate of movement of the galvanometer mirror 21 and the rate of movement of the film and adjusting the light intensity or dotting rate as a function of both monitored movements to produce a constant density log.

To monitor the rate of movement of the galvanometer mirror 21, a grating comprising a plurality of vertical slits is situated in front of a constant intensity light source 35. The resulting vertical slits of light form an object for a collecting lens 36 which directs these vertical beams of light to the rotatable mirror 21 and then to a second grating 37. When the vertical beams of light produced by the first grating 35 line up with the openings in the second grating 37, light is passed via focusing lens 38 to a photocell 39. On the other hand, when the vertical columns of light line up with the opaque portions of this second grating 37, no light can pass to the photocell 39. Therefore, as the mirror 21 rotates, a plurality of pulses of light will be passed to the photocell 39. The frequency of these pulses of light received by the photocell 39 will be proportional to the rate of rotation of the mirror 21.

The photocell 39 applies the electrical signal produced in response to each pulse of light to an amplifier 40 which amplifies these pulses of electrical energy to a level which can be used by subsequent electronic circuits. The output pulses from the amplifier 40 are applied to the input of a voltage-sensitive trigger 41 which produces an output pulse whenever the input voltage level exceeds a predetermined level. This trigger 41 tends to prevent noise from being mistaken as authentic galvanometer movement pulses.

A mechanically driven pulser 44 connected to rotating shaft 27 produces a pulse for each given increment of rotation of the shaft 27, and thus each increment of movement of the cable 12. A voltage-sensitive trigger 45 shapes these pulses. It can be seen that the rate of the pulses from the voltage-sensitive trigger 45 will be proportional to the rate of movement of the cable 12 and thus also the rate of movement of the film 26.

Both the galvanometer mirror movement pulses from trigger 41 and the film movement pulses from trigger 45 are applied to a logic circuit 46 which operates to select whichever train of pulses has the highest frequency. The galvanometer and film movement pulses are shown in FIGS. 3A and 3C respectively. Within the logic circuit 46 the galvanometer and film movement pulses are applied to NAND-gates 47 and 48 respectively which operate to invert the polarity of the incident pulses to produce the inverted pulses shown in FIGS. 3B and 3D. The inverted film movement pulses set a pair of flip-flops 49 and 50 on their DC set inputs and toggle a flip-flop 51. The waveforms on the complementary output of flip-flop 49 and the normal output of flip-flop 50 are shown in FIGS. 3E and 3F respectively. The inverted galvanometer movement pulses set the flip-flop 51 as well as flip-flop 52 on their DC set inputs. The complementary outputs from flip-flops 49 and 51 toggle the flip-flops 50 and 52 respectively. The waveforms on the complementary output of flip-flop 51 and normal output of flip-flop 52 are shown in FIGS. 3G and 3H respectively. All of the flip-flops 49–52 are set by ground (0) potential and toggled on the pulse rolling edges. A DC set input will override a toggle input.

The normal output of flip-flop 50 is connected to one input of a NAND-gate 53 and the normal output of flip-flop 52 is connected to one input of a NAND-gate 54. The NAND-gates 53 and 54 are cross-connected to form a standard "latch" circuit. The output of NAND-gate 53 and the galvanometer movement pulses are applied to separate inputs of a NAND-gate 55 and the output of NAND-gate 54 and the film movement pulses are applied to separate inputs of a NAND-gate 56. The outputs from NAND-gates 55 and 56 are combined by NAND-gate 57. The waveforms of the outputs from NAND-gates 53, 54, 55 and 56 are shown in FIGS. 3I–3L respectively.

Concerning the operation of the logic circuit 46, this circuit operates to select whichever train of pulses, galvanometer or film movement, has the higher frequency and pass these higher frequency pulses to other circuitry (to be described later) for further processing. To accomplish this, the circuit 46 searches for the occurrence of at least two successive pulses of one type (i.e., film movement or galvanometer movement) before one pulse of the other type. In this event, the circuit switches to a mode where only the higher frequency pulses are selected.

The gates 55 and 56 operate to pass either the galvanometer or film movement pulses under control of the gates 53 and 54 respectively. The flip-flops 49 and 50 search for the condition where the galvanometer movement pulses have a frequency or repetition rate greater than for the film movement pulses and the flip-flops 51 and 52 search for the opposite condition. So long as the galvanometer and film movement pulses alternate in time with one another, the falling edges of the complementary output pulses from flip-flops 49 and 51 will coincide with the inverted film and galvanometer movement pulses respectively such that the flip-flops 50 and 52 will remain in their set states. However, when this alternate mode of operation ceases and two successive pulses on one type occur before a pulse of the other type appears, one of the flip-flops 50 or 52 will momentarily switch to its reset state, thus switching the latch circuit comprising NAND-gates 53 and 54. When this latch circuit switches, the NAND-gate 55 or 56 which was previously disabled will become enabled while the other NAND-gate 55 or 56 will become disabled.

Referring to FIGS. 1 and 3A–3M in conjunction to consider an example of this operation, assume that the latch circuit 53–54 is initially in a state where the NAND-gate 57 is enabled to pass the galvanometer movement pulses. In this situation, the output of NAND-gates 53 and 54 will be "1" and "0" respectively, thus enabling NAND-gate 55 to pass the galvanometer movement pulses (see FIG. 3K).

Now, assume that the film movement pulses increase in frequency relative to that of the galvanometer movement pulses. When two successive film movement pulses appear before one galvanometer movement pulse appears as represented by the pulses 60 and 61 of FIG. 3C, the flip-flop 51 will be toggled by the second film movement pulse 61 to its set state, thus causing the complementary output of flip-flop 51 to fall (1 to 0) without the simultaneous occurrence of a galvanometer movement pulse. Thus, the flip-flop 52 can no longer be maintained in its set state and proceeds to reset, thus resetting the latch circuit 53–54 (i.e., NAND-gate 54 goes to the "1" level and gate 53 goes to the "0" level as seen in FIGS. 3I and 3J). This causes the NAND-gates 55 and 56 to reverse their enable-disable configuration such that film movement pulses are passed as seen in FIGS. 3K, 3L and 3M.

If this situation should reverse again and two galvanometer movement pulses appear before one film movement pulse, as represented by the pulses 62 and 63 of FIG. 3A, the flip-flops 49 and 50 will detect this occurrence and proceed to switch the latch circuit 53–54 as seen in FIGS. 3I and 3J. This reverses the disable-enable configuration of NAND-gates 55 and 56 as seen in FIGS. 3K and 3L.

The selected pulses from logic circuit 46 are applied to a binary counter 70 which counts these pulses and resets itself after a given number of incident pulses. A selectable logic circuit 71 is connected to the various stages of the binary counter 70 for producing a control signal determinable by the desired coding to be applied to the trace on the film 26. The selectable logic circuit can take the form of a well-known binary matrix circuit with switches connected to the matrix circuit in a well-known manner to select any desired logic combination. The output signal from the selectable logic circuit 71 enables an AND-gate 72 to pass the output pulses from the logic circuit 46 to an adjustable pulse width one-shot 73.

Thus, it can be seen that the selectable logic circuit 71 determines the coding on the film For example, circuit 71 could be set to pass three output pulses from logic circuit 46 and inhibit one, or pass two and inhibit two, etc. This coding enables one well log measurement to be distinguished from another.

The adjustable period one-shot 73 produces pulses having a pulse width dependent on the frequency of the pulses from the AND-gate 72. These adjustable width pulses are applied to a lamp driving circuit 74 for energizing the lamp 22 so as to produce an image on the film 26. As will be explained below, the pulse width of the pulses from the adjustable pulse width one-shot 73 are selected to produce a constant exposure time at each point on the film 26 regardless of the rate of rotation of the mirror 21 or rate of movement of the film 26.

Figure 4A:
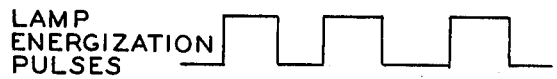
FIGS. 4A, 4B, 5, 7A and 7B are graphical representations of certain parameters of the system of FIG. 1 versus time for use in explaining the operation of the apparatus of the present invention.
Figure 4B:
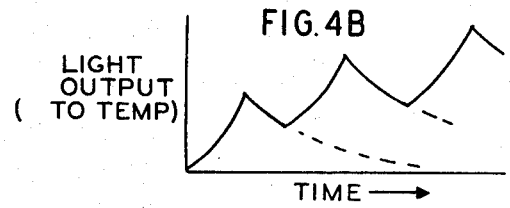

When using incandescent lamps, the light output is approximately proportional to temperature. When energized, the lamp will increase in temperature very quickly and then decays at a relatively slow rate. Thus, referring to FIGS. 4A and 4B where FIG. 4A illustrates a lamp energization pulse and FIG. 4B illustrates the resulting light output, it can be seen how the light output and temperature increases rapidly during energization and decays slowly after energization. If a second lamp energization pulse of the same duration as the first pulse should appear a short time after the first pulse has terminated as represented in FIG. 4A, the temperature and thus light output will increase to a relatively high level, and so on with a third pulse, etc. Therefore, the light output will vary as a function of the frequency of the lamp energization pulses.

Figure 5:
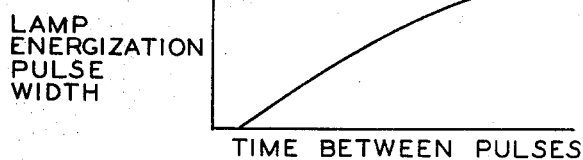

It is the purpose of the adjustable pulse width one-shot 73 to adjust the pulse width of these energization pulses as a function of their frequency to compensate for this effect. Since the increase and decay of temperature of the lamp is nonlinear, the pulse width of the lamp energization pulses should vary in a nonlinear manner with the pulse period, as illustrated in FIG. 5.

It should be noted here that if lamps which turn on and off rapidly were used it would not be necessary to adjust the width of the pulses applied to the lamp. Examples of such lamps are glow modulator tubes or flash lamps of the arc type.

Figure 6:
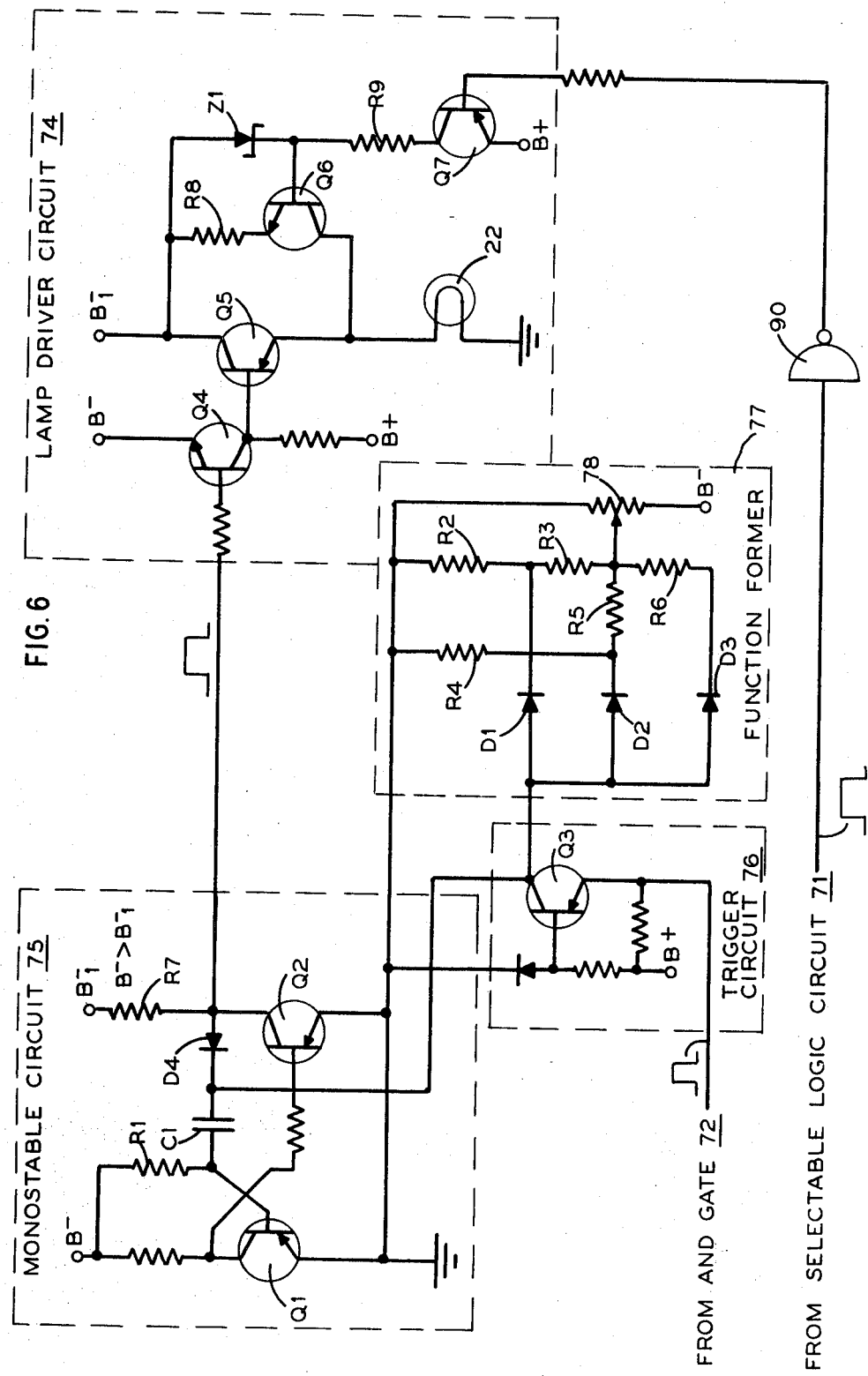
FIG. 6 is a circuit diagram showing certain portions of the FIG. 1 apparatus in greater detail.

Referring now to FIG. 6, the adjustable pulse width one-shot 73 and lamp driver circuit 74 are shown in greater detail. First, concerning the one-shot 73, it includes a standard monostable multivibrator 75, a standard trigger circuit 76 and a function former 77. Briefly, concerning the monostable circuit 75 and trigger circuit 76, a transistor Q1 is normally conducting, thus maintaining a transistor Q2 off. When a pulse is received from AND-gate 72, a transistor Q3 which is normally off, conducts to charge its collector to approximately zero volts. The charge on the timing capacitor $C_1$ then biases the transistor Q1 off, which in turn switches the transistor Q2 on. The capacitor $C_1$ discharges and then charges with an opposite polarity through a resistor $R_1$ until transistor Q1 turns on again.

To adjust the pulse width of the pulses produced on the collector of transistor Q2 as a function of the incident pulse frequency is the purpose of the function former circuit 77. To accomplish this, the function former operates only while the monostable circuit 75 is in its stable state to charge the timing capacitor $C_1$ to a value which will cause the next lamp energization pulse to have a pulse width corresponding with the graph of FIG. 5 so that the light output will be at the correct value for optimum film exposure regardless of the pulse repetition rate.

Concerning this function forming process in greater detail, three diodes $D_1$, $D_2$, and $D_3$ are biased by a network of resistors to selectively turn off as the voltage on the transistor Q2 side of capacitor $C_1$ decreases to thus produce the circuit response given by the curve of FIG. 5. The diode $D_1$ is biased by a voltage divider network comprising resistors $R_2$ and $R_3$; the diode $D_2$ is biased by a voltage divider network comprising resistors $R_4$ and $R_5$, and the diode $D_3$ is connected directly through a resistor $R_6$ to the wiper arm of a potentiometer 78 to which also are connected the other two voltage divider networks.

Immediately after the monostable circuit 75 has returned to its stable state, all three diodes $D_1$, $D_2$ and $D_3$ are biased to conduct by way of the potentiometer 78 to a negative DC supply voltage B⁻. The values of these resistors are desirably selected such that the diode $D_1$ turns off first, $D_2$ second, and $D_3$ last. Additionally, the values of resistors $R_2$ and $R_3$ are much less than that for resistors $R_4$ and $R_5$ such that $D_1$ will draw more current than $D_2$. Likewise, the value of resistor $R_6$ should be higher than that for $R_4$ and $R_5$ so that $D_2$ will draw more current than $D_3$.

By this arrangement, the total charge drawn from capacitor $C_1$ per incident pulse from AND-gate 72 will be such as to produce the pulse width versus period function of FIG. 5. That is, since the lower portion of the curve to the breakpoint "$a$" has a greater slope than the second portion of the curve to the breakpoint "$b$," which in turn is greater than that for the last portion of the curve, the capacitor $C_1$ will charge rapidly immediately after the monostable circuit returns to its stable state, less rapidly during an intermediate period, and finally at a very slow rate. Thus, the longer the time period between successive pulses from AND-gate 72, the more negative will be the voltage on the Q2 side of timing capacitor $C_1$ after trigger circuit 76 initiates the discharge of capacitor $C_1$ and thus, the more time for this capacitor to discharge and then charge in the reverse polarity to the value for which transistor Q1 will turn on. Because of the function former 77, this discharge time and thus the pulse width of each pulse generated by the monostable circuit will be a nonlinear function of the time between successive incident pulses from AND-gate 72, the function given by FIG. 5. It should be noted that a diode $D_4$ prevents the capacitor $C_1$ from charging through the transistor Q2 collector resistor $R_7$ when the circuit is in its stable state.

Figure 7A:
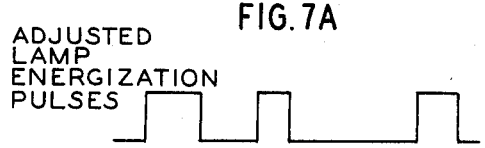
Figure 7B:
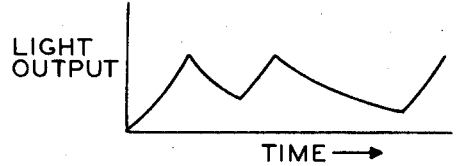

Turning now to FIGS. 7A and 7B, where FIG. 7A represents the adjusted lamp energization pulses and FIG. 7B represents light output versus time (FIGS. 7A and 7B are vertically or time scale aligned), it can be seen that the durations of the adjusted pulses of FIG. 7A are such as to maintain the correct average light output for optimum film exposure to remain constant.

Returning to FIG. 6 the adjusted lamp energization pulses are then applied to the lamp driver circuit 74 which operates to power the lamp 22. Within the circuit 74, a transistor Q4 is turned on by the positive going pulses from the monostable circuit 75 which, in turn, causes a power transistor Q5 to turn on and supply current to the lamp 22.

With miniature incandescent lamps of the type used here, the lamp filament has a low resistance when cold and a high resistance when hot. To eliminate a relatively long delay between the time a lamp is energized and a visible light appears, it is desirable to maintain the lamp slightly hot at all times in readiness for a lamp energization pulse. To accomplish this, an idling current is supplied to the lamp by a constant current circuit comprising a transistor Q6, resistor $R_8$, Zener diode Z1, and a normally conducting transistor Q7 supplying current to the base of transistor Q6 via a resistor R9. This arrangement constitutes the usual manner of producing a constant current.

When each lamp energization pulse from monostable circuit 75 terminates, there is some time lag before the light output decays to a nonvisible level, as represented in FIG. 4B. Where the lamp is being turned on and off to produce a dot or dash trace pattern designed to appear as a continuous trace to the naked eye, this long decay is desirable because a gray area will appear between each trace, thus further enhancing the quality of the trace. The idling current tends to boost the overall light output and thus contribute, or even cause, this gray area between dots or dashes.

However, when coding, this trailing gray area would give an undesirable appearance to the recorded log and is thus objectional in this situation. It would be better to prevent all light from reaching the film when the coding control dictates a blank or light (as opposed to dark) area. To accomplish this in FIG. 6, the coding control signal from the selectable logic circuit 71 is inverted in a NAND-gate 90 and used to switch off the transistor Q7 whenever the lamp energization pulses are blanked by AND-gate 72. When Q7 is turned off, Q6 turns off, thus stopping the idling current. At times other than when these pulses are blanked, the coding control signal will be at the "1" level, thus causing the output of the NAND gate to be at zero or a negative potential. This biases Q7 to its conducting state to thereby produce the idling current.

While only one recording channel (i.e., only one galvanometer) was illustrated in FIG. 1, it is to be understood that the techniques of the present invention could be used with as many recording channels as is desired. If more than one recording channel is desired, a duplicate set of apparatus would be necessary for each channel since the galvanometer speed will be different for the different channels. However, only one film movement pulse generating source is necessary unless separate films are to be driven at different speeds.

The above discussion concerned the application of the techniques of the present invention to the type of recording system which turns the recording light beam on and off to produce a dotted type of trace pattern. The techniques of the present invention are also applicable to the type of recording apparatus which produces a continuous coded or uncoded trace on the film. Additionally, the logic circuit of FIG. 1 operated to select whichever train of pulses had the higher repetition rate for use in energizing the lamp (after coding). This operation can be better understood by referring to FIG. 8 where there is shown a vector representation of galvanometer velocity on the vertical axis and film velocity on the horizontal axis. The logic circuit 46 of FIG. 1 would, in this FIG. 8 situation, measure only the galvanometer velocity vector and ignore the film velocity vector and control the dotting rate (rate at which light is turned on and off) as a function of galvanometer velocity only. Because of the orthogonal nature of these two velocity vectors, such a techniques is usually not too far in error. However, the most accurate way of controlling the dotting rate would be to determine the resultant of these two orthogonal vectors and use this resultant vector to control dotting rate or lamp intensity.

Turning now to FIG. 9, there is shown an alternative embodiment of the present invention which operates to determine the resultant value of the repetition rate of the two trains of pulses and control the light intensity, rather than the repetition rate. To this end, the galvanometer and film movement pulses from triggers 41 and 45 respectively are applied to a resolver 80 which performs the operation depicted in FIG. 8 to produce a train of pulses whose repetition rate is proportional to the vector resultant of the repetition rates of the galvanometer and film movement pulses. The resolver 80 could be constructed a number of ways to perform this function. For example, DC-type signals representative of the repetition rates of the two pulse trains could be produced and processed in accordance with the expression $\sqrt{V_f^2 + V_G^2}$ where $V_f$ is film velocity and $V_G$ is galvanometer velocity to produce an output signal representative of the resultant velocity vector. This output signal could then be used to generate a new pulse train having a repetition rate representative of this resultant velocity vector.

The resultant velocity pulse train from resolver 80 is then converted to a DC signal proportional to pulse rate by a pulse rate to DC converter 81. This DC signal is then adjusted by a function former circuit 82 to compensate for the nonlinear variation of light intensity with driving current for the lamp 22. The binary counter 70 and a selectable logic circuit 71 are responsive to the output pulses from the resolver 80 to produce a coding control signal in the same manner as was done in the FIG. 1 system. The coding control signal from circuit 71 controls an analog signal gate 83 which, when enabled, passes the function-formed lamp control signal from function former 82 to the lamp driving circuit 74 for powering the lamp 22. The coding control signal is also applied to the lamp 22 and to the lamp driving circuit for the same reasons as discussed in connection with the FIG. 1 system.

If desired, the coding control features of FIG. 9 could be omitted, in which case the vector resolver 80 could produce a DC-type signal instead of a pulse-type signal, and the converter 81 could be omitted.

It can be seen that with the methods and apparatus of the present invention, well logging signals can be recorded with an even trace density regardless of the variations in frequency of the signals to be recorded (i.e., regardless of the variations in galvanometer velocity) or variations in film velocity. This even trace density can be accomplished for those recording systems which produce a continuous trace or those systems which dot or dash the trace. In either type of system, the results can be accomplished regardless of whether the trace is coded or not.

It should be mentioned here that if a nonincandescent lamp, such as a glow modulator or flash arc type is used, the function former 77 would not be necessary. These types of lamps turn on and off very rapidly; thus each light pulse would have the same light output regardless of the rate of pulsing. The same light pulse width would provide optimum exposure at all writing rates.

While the particular energy source shown in the drawings was a lamp, it is to be understood that other types of energy sources could be used in accordance with the present invention. For example, a cathode ray tube could be used to produce the energy beam.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording well logging signals, comprising:
   deriving well logging signals representative of at least one subsurface parameter over a section of a borehole;
   producing a radiant energy beam;
   moving a recording medium as a function of borehole depth and positioning said energy beam at a location on said recording medium determined by the amplitude of said signals;
   generating a series of pulses representative of the movement of said beam across said recording medium or the movement of said recording medium;
   adjusting the time durations of each of said pulses as a function of the repetition rate of a plurality of said pulses; and
   using said adjusted pulses to repetitively turn said energy beam on and off.

2. A method of recording well logging signals, comprising:
   deriving well logging signals representative of at least one subsurface parameter over a section of a borehole;
   producing a radiant energy beam;
   moving a recording medium as a function of borehole depth and positioning said energy beam at a location on said recording medium determined by the amplitude of said signals;
   generating two series of pulses whose rates are individually representative of the rate of movement of said recording medium and the rate of movement of said energy beam in a direction transverse to the direction of movement of said recording medium; and
   selecting that series of pulses which has the highest repetition rate for turning said energy beam on and off to produce a relatively even density appearing trace on at least one portion of said recording medium.

3. The method of claim 2 wherein said step of selecting pulses for turning said energy beam on and off also includes generating from said selected series of pulses a compensated series of pulses having pulse time durations representative of the repetition rate of said series of pulses, and using said compensated series of pulses to turn said energy beam on and off.

4. Apparatus for recording well logging signals, comprising:
means for deriving well logging signals representative of at least one subsurface parameter over a section of a borehole;
means for recording said signals including a controllable light source for producing a light beam, a recording medium adapted to be moved as a function of borehole depth, and means responsive to said signals for positioning said light beam at a location on said recording medium determined by the amplitude of said signals;
means operative as a function of the movement of said beam across said recording medium for generating a first series of pulses representative of the velocity of said beam;
means responsive to said series of pulses for generating a second series of pulses having pulse time durations representative of the repetition rate of said first series of pulses; and
means responsive to said second series of pulses for repetitively energizing said controllable light source to cause a relatively even density appearing trace to be produced on a least one portion of said recording medium regardless of the rate of movement of said light beam.

5. The apparatus of claim 4 wherein said means for generating a second series of pulses includes monostable means for generating said second series of pulses in response to at least some of said first series of pulses, and adjusting means responsive to the time duration between successive ones of said first pulses for adjusting a parameter of said monostable means, which parameter controls the time duration of pulses generated by said monostable means.

6. The apparatus of claim 5 wherein said adjusting means includes function former means for varying said monostable means control parameter as a nonlinear function of the time period between successive pulses of said first series of pulses.

7. Apparatus for recording well logging signals, comprising:
means for deriving well logging signals representative of at least one subsurface parameter over a section of a borehole;
means for recording said signals, including a controllable radiant energy source for producing a radiant energy beam, a recording medium adapted to be moved as a function of borehole depth, and means responsive to said signals for positioning said beam at a location on said recording medium determined by the amplitude of said signals;
means functionally related to the movement of said beam across said recording medium or the movement of said recording medium for generating a series of pulses whose rate is representative of a function of one or both of said movements;
counting means for counting said generated series of pulses;
selectable logic means responsive to the state of said counting means for generating a control signal representative of a selected coding pattern;
means responsive to said control signal and said generated series of pulses for producing a coded series of pulses; and
means for applying representations of said coded series of pulses to said controllable radiant energy source to modulate a parameter of said controllable energy source for producing coded representations of at least one of said well logging signals on said recording medium.

8. Apparatus for recording well logging signals, comprising:
means for deriving well logging signals representative of at least one subsurface parameter over a section of a borehole;
means for recording said signals, including a controllable light source for producing a light beam, a recording medium adapted to be moved as a function of borehole depth, and means responsive to said signals for positioning said light beam at a location on said recording medium determined by the amplitude of said signals;
means operative as a function of the movement of said beam across said recording medium or the movement of said recording medium for generating a series of pulses whose rate is representative of a function of one or both of said movements;
coding means for processing said series of pulses to produce a coded series of pulses;
means for supplying an idling current to said light source to bias said light source to a level which enables said light source to rapidly produce a relatively bright light output upon being energized;
means responsive to said coded series of pulses for repetitively energizing said light source to produce a coded series of traces on said recording medium; and
means operative in synchronism with the operation of said coding means for deenergizing said idling current generating means whenever said light source is to be turned off under control of said coding means.

9. Apparatus for recording well logging signals, comprising:
means for deriving well logging signals representative of at least one subsurface parameter over a section of a borehole;
means for recording said signals, including a controllable radiant energy source for producing a radiant energy beam, a recording medium adapted to be moved as a function of borehole depth, and means responsive to said signals for positioning said beam at a location on said recording medium determined by the amplitude of said signals;
means functionally related to the movement of said beam across said recording medium or the movement of said recording medium for generating a series of pulses whose rate is representative of a function of one or both of said movements;
coding means for processing said series of pulses to produce a coded series of pulses; and
means for adjusting the time duration of each of said coded series of pulses as a function of the repetition rate of said coded series of pulses, and means responsive to said adjusted pulses for repetitively energizing said energy source to produce coded representations of at least one of said well logging signals on said recording medium.

10. Apparatus for recording well logging signals, comprising:
means for deriving well logging signals representative of at least one subsurface parameter over a section of a borehole;
means for recording said signals, including a controllable light source for producing a light beam, a recording medium adapted to be moved as a function of borehole depth, and means responsive to said signals for positioning said light beam at a location on said recording medium determined by the amplitude of said signals;
means operative as a function of the movement of said beam across said recording medium or the movement of said recording medium for generating a series of pulses representative of one or both of said movements;
means for generating an idling current for application to said light source; and
means responsive to said series of pulses for repetitively switching said light source on and off whereby said idling current operates to bias said light source to a level which enables rapid switching thereof.

11. Apparatus for recording well logging signals, comprising:
means for deriving well logging signals representative of at least one subsurface parameter over a section of a borehole;

means for recording said signals, including a controllable radiant energy source for producing a radiant energy beam, a recording medium adapted to be moved as a function of borehole depth, and means responsive to said signals for positioning said energy beam at a location on said recording medium determined by the amplitude of said signals;

means operative as a function of the movement of said beam across said recording medium and the movement of said recording medium for generating two separate signal representative thereof;

means responsive to said two separate signals for selecting that one which reflects the highest rate of movement; and means responsive to said selected signal for varying a parameter of said controllable energy source to cause a relatively even density appearing trace to be produced on at least one portion of said recording medium.

12. Apparatus for recording well logging signals, comprising:

means for deriving well logging signals representative of at least one subsurface parameter over a section of a borehole;

means for recording said signals, including a controllable radiant energy source for producing a radiant energy beam, a recording medium adapted to be moved as a function of borehole depth, and means responsive to said signals for positioning said energy beam at a location on said recording medium determined by the amplitude of said signals;

means operative as a function of the rate of movement of said energy beam in a direction transverse to the direction of movement of said recording medium and as a function of the rate of movement of said recording medium for generating two series of pulses whose rates are individually representative of said movement rates; and means responsive to said two series of pulses for repetitively energizing said controllable energy source in a manner to produce a relatively even density appearing trace on at least one portion of said recording medium.

13. The apparatus of claim 12 wherein said means for energizing said controllable energy source includes means responsive to said two series of pulses for generating an output series of pulses having pulse time durations representative of the repetition rate of said series of pulses, and means responsive to said output series of pulses for repetitively energizing said controllable energy source.

14. The apparatus of claim 12 wherein said means responsive to said two series of pulses for energizing said energy source includes logic means for selecting that series of pulses which has the higher repetition rate, and means responsive to said selected series of pulses for repetitively energizing said energy source.

15. Apparatus for recording well logging signals, comprising:

means for deriving well logging signals representative of at least one subsurface parameter over a section of a borehole;

means for recording said signals, including a controllable radiant energy source for producing a radiant energy beam, a recording medium adapted to be moved as a function of borehole depth, and means responsive to said signals for positioning said energy beam at a location on said recording medium determined by the amplitude of said signals;

means responsive to the movement of said beam across said recording medium and the movement of said recording medium for producing a series of pulses;

coding means for processing said series of pulses to produce a coded series of pulses;

means for supplying an idling current to said energy source to bias said energy source to a level which enables said energy source to rapidly produce a relatively high energy output upon being energized;

means responsive to said coded series of pulses for repetitively energizing said energy source to produce a coded series of traces on said recording medium; and means operative in synchronism with the operation of said coding means for deenergizing said idling current generating means whenever said energy source is to be turned off under control of said coding means.

16. Apparatus for recording well logging signals, comprising:

means for deriving well logging signals representative of at least one subsurface parameter over a section of a borehole;

means for recording said signals including a controllable light source for producing a light beam, a recording medium adapted to be moved as a function of borehole depth, and rotatable reflective means responsive to said signals for reflecting said light beam to a location on said recording medium determined by the amplitude of said signals;

means operative as a function of the rotational movement of said rotatable reflective means for generating a first series of pulses representative of the angular movement of said reflective means;

means responsive to said series of pulses for generating a second series of pulses having pulse time durations representative of the repetition rate of said first series of pulses; and means responsive to said second series of pulses for repetitively energizing said controllable light source to cause a relatively even density appearing trace to be produced on at least one portion of said recording medium regardless of the rate of movement of said rotatable reflective means.

17. Apparatus for recording well logging signals, comprising:

means for deriving well logging signals representative of at least one subsurface parameter over a section of a borehole;

means for recording said signals, including a controllable light source for producing a light beam, a recording medium adapted to be moved as a function of borehole depth, and rotatable reflective means responsive to said signals for reflecting said light beam to a location on said recording medium determined by the amplitude of said signals;

means operative as a function of the rotational movement of said rotational reflective means or the movement of said recording medium for generating a series of pulses whole rate is representative of a function of one or both of said movements;

coding means for processing said series of pulses to produce a coded series of pulses;

means for supplying an idling current to said light source to bias said light source to a level which enables said light source to rapidly produce a relatively bright light output upon being energized;

means responsive to said coded series of pulses for repetitively energizing said light source to produce a coded series of traces on said recording medium; and means operative in synchronism with the operation of said coding means for deenergizing said idling current generating means whenever said light source is to be turned off under control of said coding means.

18. Apparatus for recording well logging signals, comprising:

means for deriving well logging signals representative of at least one subsurface parameter over a section of a borehole;

means for recording said signals, including a controllable light source for producing a light beam, a recording medium adapted to be moved as a function of borehole depth, and rotatable reflective means responsive to said signals for reflecting said light beam to a location on said recording medium determined by the amplitude of said signals;

means operative as a function of the movement of said rotatable reflective means or the movement of said recording medium for generating a series of pulses representative of one or both of said movements;

means for generating an idling current for application to said light source; and means responsive to said series of pulses for repetitively switching said light source on and off whereby said idling current operates to bias said light source to a level which enables rapid switching thereof.

19. Apparatus for recording well logging signals, comprising:

means for deriving well logging signals representative of at least one subsurface parameter over a section of a borehole;

means for recording said signals, including a controllable radiant energy source for producing a radiant energy beam, a recording medium adapted to be moved as a function of borehole depth, and rotatable reflective means responsive to said signals for reflective means responsive to said signals for reflecting said energy beam to a location on said recording medium determined by the amplitude of said signals; and means operative as a function of the rate of rotational movement of said rotatable reflective means and as a function of the rate of movement of said recording medium for generating two series of pulses whose rates are individually representative of said movement rates; and means responsive to said two series of pulses for repetitively energizing said controllable energy source in a manner to produce a relatively even density appearing trace on at least one portion of said recording medium.

20. Apparatus for recording well logging signals, comprising:

means for deriving well logging signals representative of at least one subsurface parameter over a section of a borehole;

means for recording said signals, including a controllable radiant energy source for producing a radiant energy beam, a recording medium adapted to be moved as a function of borehole depth, and means responsive to said signals for positioning said energy beam at a location on said recording medium determined by the amplitude of said signals;

means operative as a function of the rate of movement of said energy beam in a direction transverse to the direction of movement of said recording medium and as a function of the rate of movement of said recording medium for generating two series of pulses whose rates are individually representative of said movement rates;

means responsive to said first and second series of pulses for selecting that series of pulses which has the higher repetition rate; and means responsive to said selected series of pulses for energizing said controllable energy source in a manner to produce a relatively even density appearing trace on at least one portion of said recording medium.

* * * * *

UNITED STATES PATENT OFFICE
CERTIFICATE OF CORRECTION

Patent No. 3,634,865　　　　　　　　　Dated January 11, 1972

Inventor(s) Clifford O. Schafer

It is certified that error appears in the above-identified patent and that said Letters Patent are hereby corrected as shown below:

IN THE CLAIMS:

Column 11, claim 11, line 10, delete "signal" and substitute --signals--;

Column 13, claim 19, lines 20 and 21, after "signals" in line 20, delete the sentence "for reflective means responsive to said signals".

Signed and sealed this 15th day of May 1973.

(SEAL)
Attest:

EDWARD M. FLETCHER, JR.　　　　　　ROBERT GOTTSCHALK
Attesting Officer　　　　　　　　　　Commissioner of Patents